United States Patent
Schauf et al.

(10) Patent No.: US 9,796,306 B2
(45) Date of Patent: Oct. 24, 2017

(54) HEADREST FOR A VEHICLE SEAT

(71) Applicant: Ford Global Technologies, LLC, Dearborn, MI (US)

(72) Inventors: Carsten Schauf, Nordrhein-Westfalen (DE); Uwe Wagner, Wermelskirchen (DE); Daniel Hari, Cologne (DE); Kilian Vas, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/827,663

(22) Filed: Aug. 17, 2015

(65) Prior Publication Data

US 2016/0046219 A1 Feb. 18, 2016

(30) Foreign Application Priority Data

Aug. 18, 2014 (DE) .......................... 10 2014 216 307

(51) Int. Cl.
*B60N 2/48* (2006.01)
(52) U.S. Cl.
CPC ......... *B60N 2/4882* (2013.01); *B60N 2/4805* (2013.01)
(58) Field of Classification Search
CPC ...... B60N 2/48; B60N 2/4805; B60N 2/4829; B60N 2/4832; B60N 2002/48; B60N 2002/4888
See application file for complete search history.

(56) References Cited

U.S. PATENT DOCUMENTS

| | | | | |
|---|---|---|---|---|
| 5,411,468 A | * | 5/1995 | Chen | B60N 2/4882 297/217.3 |
| 5,806,933 A | * | 9/1998 | Tsui | A47C 7/38 297/216.12 |
| 6,120,099 A | | 9/2000 | Reikeras et al. | |
| 6,220,668 B1 | | 4/2001 | Scheffzuck | |
| 6,250,716 B1 | * | 6/2001 | Clough | A47C 7/383 297/391 |
| 6,513,871 B2 | * | 2/2003 | Bartels | B60N 2/4808 297/216.12 |
| 7,264,313 B2 | * | 9/2007 | Clough | A47C 7/38 297/406 |
| 8,573,701 B2 | * | 11/2013 | Yetukuri | B60N 2/48 297/216.12 |
| 8,911,020 B2 | * | 12/2014 | Westerink | B64D 11/06 297/406 |
| 9,028,000 B2 | * | 5/2015 | Millan | B60N 2/4808 297/391 |
| 2005/0161993 A1 | | 7/2005 | Flory et al. | |

FOREIGN PATENT DOCUMENTS

| | | |
|---|---|---|
| DE | 19955046 | 5/2001 |
| DE | 102004058788 | 6/2006 |

\* cited by examiner

*Primary Examiner* — Philip F Gabler
(74) *Attorney, Agent, or Firm* — Vichit Chea; Price Heneveld LLP

(57) ABSTRACT

A headrest for a vehicle seat includes a center part and at least one side wing disposed on a side of the center part in a movable manner between a neutral position and a range of comfort positions. A retaining strut is coupled to the side wing at a living hinge disposed on a first end of the retaining strut. The retaining strut is further coupled to the center part in a longitudinally movable manner at a second end of the retaining strut.

20 Claims, 2 Drawing Sheets

HEADREST FOR A VEHICLE SEAT

CROSS-REFERENCE TO RELATED APPLICATION

This application claims priority to DE 102014216307.2, filed on Aug. 18, 2014, the entire contents of which are hereby incorporated herein by reference.

FIELD OF THE INVENTION

The present invention relates to a headrest for a vehicle seat.

BACKGROUND OF THE INVENTION

In headrests for vehicle seats which are known in the art, functionality, comfort and construction size compete with one another. First and foremost, the headrest should be able to offer a user good head adjustment with a protective function against the effects of external forces. Headrests with side wings to improve head adjustment are already known from the state of the art. In particular, the side wings on headrests of this kind can be used to secure the user's head when resting or sleeping to prevent it from slipping sideways off the headrest.

A headrest of this kind is known from DE 10 2004 058 788 A1, for example. The headrest has at least one swiveling padded part which is mounted in a swiveling movable manner on a central pad. So as to allow comfortable adjustment of the headrest, it is provided that a bladder which can be filled with fluid is arranged in the padded part between the padding carrier and the padded part to swivel the padded part.

A further headrest is described in US 2005/0161993 A1 which has a center pad and two side pads laterally hinged to the center pad which can be swiveled forward into a resting position or back into a supporting position. In order to offer optimal support to the head in the upright and also in the laid-back head posture, the center pad has a variable pad hardness, so that the center pad displays a firmer pad hardness in the supporting position than in the resting position.

Furthermore, a headrest is disclosed in U.S. Pat. No. 6,220,668 B1 which comprises a center head padded part and two side wings assigned to the head padded part which project beyond the front of the pad to the side on the center head padded part in the in-use position and can be swiveled into the contour of the center head padded part in the out-of-use position. The two side wings can be swiveled in a mirror-symmetrical manner in respect of the vertical center line of the center head pad and cover the back of the center head padded part in the out-of-use position.

In addition, U.S. Pat. No. 6,120,099 discloses a headrest for a vehicle seat with a front surface and two side surfaces, wherein the headrest has two members that can be extended from the side surfaces which are completely contained in the headrest to begin with, but which are designed to move with a sliding movement into an extended position. The members then extend sideways relative to the headrest and furthermore forwards relative to the headrest, wherein they form an additional support for a user's head in the seat.

DE 199 55 046 B4 discloses a headrest over which a supporting cushion can be slipped.

Against this background, the problem addressed by the present invention is that of providing a headrest for a vehicle seat which offers an adjusted, comfortable and secure support for a user's head. In particular, the headrest should exhibit good directional control of the head and be configured in such a manner that it supports an upright head posture when driving or reading, for example, and also a relaxed head posture, when resting or sleeping, for example. Moreover, in order to provide these features, the headrest is to have a particularly simple and cheap-to-produce design which in addition requires the smallest possible number of components. Moreover, the headrest should also offer easy, intuitive operation. Furthermore, a vehicle seat should be provided with a corresponding headrest.

SUMMARY OF THE INVENTION

According to the invention, a headrest for a vehicle seat comprises a center part, a fastening means for fastening the center part to a backrest of the vehicle seat and at least one side wing which is mounted in a movable swiveling manner in respect of the center part between a neutral position and at least one comfort position, wherein the side wing is connected to the center part by means of a swiveling hinge. The center part and the at least one side wing are preferably padded. For example, the center part and the at least one side wing each comprise a base plate which are each connected to one another by a peripheral side via the swiveling hinge. In particular, the base plate of the center part is configured in such a manner that when the headrest is attached to the vehicle seat, a peripheral side extends in parallel to an upper side of the backrest of the vehicle seat. The side wing is then arranged on a peripheral side adjacent thereto. In one embodiment, the padding is arranged on the base plates.

The neutral position of the side wing results when the side wing is arranged on the center part in such a manner that the headrest exhibits its flattest possible configuration. For example, in the neutral position the center part and the side wing are at an angle of roughly 180° to one another, as a result of which a flat configuration of the headrest is produced.

In the at least one comfort position, the side wing is swiveled out of its neutral position in respect of the center part. When the side wing is angled in respect of the center part, a user can rest their head comfortably to the side and the side wing can also offer protection against the effects of sideways forces. For example, the side wing is at an angle of between roughly 170° and roughly 90° to the center part in the comfort position.

Furthermore, in the case of the headrest according to the invention, the side wing is additionally connected to the center part by at least one retaining strut which is mounted in each case in a swiveling movable manner on the side wing and on the center part and, in addition, is also mounted in a longitudinally movable manner on the side wing and/or on the center part. Within the context of the present invention, longitudinally movable mounting means that the retaining strut is substantially displaceable in its longitudinal direction on the center part and/or on the side wing relative to the center part and/or to the side part.

The retaining strut is used to transfer compressive and shear forces between the center part and the side wing. The longitudinally movable mounting of the retaining strut is configured in such a manner in this case as to be able to fix the retaining strut in at least one position. For this purpose, the retaining strut can be fixed via frictional forces, for example, or by a catch mechanism to the center part and/or to the side wing. In this way, the side wing can be fixed in the neutral position and/or in at least one comfort position. The side wing can preferably be fixed in a plurality of comfort positions. In order to swivel the side wing in respect of the center part, only one force has to be applied by the user, by means of which the frictional force or the retaining force of the catch mechanism, which applies the longitudinally movable mounting of the retaining strut on the center part and/or on the side wing, can be overcome. This allows a particularly simple and intuitive handling of the headrest by the user. Particular knowhow, complicated manoeuvers or additional tools are advantageously not required to adjust the side wing.

According to an advantageous embodiment of the invention, the retaining strut is configured integrally with the side wing and connected to the side wing in a swiveling movable manner by means of an integral hinge. In this way, the design of the headrest can be further simplified and the number of components to be fitted can be further reduced, as the side wing and the retaining strut only form one component and can be produced in a single operation from the same material. For example, the side wing and the retaining strut can be produced as a single injection molded plastic part, as a result of which the weight of the headrest can be reduced.

According to a further advantageous embodiment of the invention, the retaining strut comprises a pin-shaped member at its end facing the center part, by means of which member the retaining strut is connected in a swiveling movable manner to the center part. In addition, the pin member in this embodiment is preferably guided in a transversely displaceable manner at each end in a link provided in the center part. On the one hand, the pin member allows swiveling movability of the retaining strut in respect of the center part and, on the other hand, the link provided in the center part in which the pin member is received at the end, substantially allows a longitudinal movement of the retaining strut relative to the center part, in that the pin member is guided in the link in a displaceable manner transversely to its longitudinal extension. The pin member is preferably of cylindrical form, particularly at the end, and has a length such that the two ends of the pin element project into the link of the center part for guiding purposes. The pin member may be configured as a separate component which is then received in a corresponding receiving means at the end of the retaining strut. It is particularly preferable, however, for the pin member to be formed integrally with the retaining strut, so that the number of components in the headrest can be reduced still further.

A further advantageous embodiment of the invention envisages that the link has at least one catch mechanism along its longitudinal extension, in which catch mechanism the pin member can be fixed. Consequently, the side wing can be fixed in at least one comfort position corresponding to the catch position in the link. The link preferably has a plurality of catch mechanisms along its longitudinal extension, so that the side wing can be fixed in further comfort positions.

According to a further advantageous embodiment, the center part is configured as a mirror-symmetrical trapezoid, in other words it has two opposite parallel peripheral sides and two opposite non-parallel peripheral sides. In this embodiment, a side wing is connected to each of the two non-parallel peripheral sides of the trapezoid. The two side wings may in particular be fixed independently of one another in different comfort positions. A user is therefore able to adjust the headrest individually according to their requirements.

In a further particularly advantageous embodiment of the invention, the center part and the at least one side wing are integrally formed. In this case, the swiveling hinge is preferably configured as an integral hinge. In this way, the design of the headrest can be simplified even further and the number of components to be fitted reduced still further, since the side wing and the center part form only one component and can be produced in a single operation from the same material. For example, the side wing and the center part can be produced as a single injection molded plastic part, as a result of which the weight of the headrest can also be reduced.

According to a further advantageous embodiment of the invention, the fastening means is designed to mount the center part in a swiveling manner relative to the backrest about a horizontal swiveling axis between at least one in-use position and one out-of-use position. For example, the center part can be swiveled within an angle range of approximately 180° about the horizontal swiveling axis. The center part preferably substantially forms an extension of the backrest in a first in-use position. The center part is particularly preferably fixable by swiveling in the direction of the front or rear of the vehicle in further in-use positions. In the out-of-use position, on one hand, the center part is turned down by swiveling in the direction of the rear of the vehicle. In this way, the fitting of any kind of child seat on the vehicle seat is made easier, as the headrest cannot represent an obstacle to the child's seat in its turned down, out-of-use position and, on the other hand, the rear view of a vehicle driver is less impeded by the headrest in its turned down, out-of-use position.

According to a further advantageous embodiment, the fastening means comprises means for adjusting the height of the headrest. This enables said headrest to be specially adjusted to the user, so that better head adjustment and optimum protection are guaranteed.

According to a further aspect, the invention comprises a vehicle seat with a backrest and a headrest arranged thereon, according to one of the previously described embodiments. For example, the center part is configured as a mirror-symmetrical trapezoid, the shorter bottom side whereof faces the backrest of the vehicle seat.

The possibility described above of moving the headrest into an out-of-use position means that an improved construction size of the vehicle seat can be achieved. Particularly when the headrest is in the out-of-use position, the vehicle seat takes on a more compact design overall, as the vertical extension of the headrest relative to the vehicle seat is smallest in the out-of-use position.

One aspect of the present invention includes a headrest for a vehicle seat, wherein the headrest includes a center part operably coupled to a backrest of the vehicle seat. At least one side wing is mounted to the center part by a swiveling hinge in a movable swiveling manner with respect to the center part between a neutral position and at least one comfort position. A retaining strut is mounted in a swiveling movable manner between the side wing and the center part, and the retaining strut is also mounted in a longitudinally movable manner on one of the side wing and the center part. The longitudinally movable mounting of the retaining strut is configured such that the retaining strut is fixed in at least one position.

Another aspect of the present invention includes a headrest for a vehicle seat. The headrest includes a center part and first and second side wings disposed on first and second sides of the center part. The first and second side wings are coupled to the center part by living hinges in a movable manner between first and second positions. Retaining struts are coupled to each of the side wings at a living hinge at one end of each retaining strut and further coupled to the center part at an opposite end of each retaining strut.

Yet another aspect of the present invention includes a headrest for a vehicle seat. The headrest includes a center part and at least one side wing disposed on a side of the center part in a movable manner between a neutral position and a range of comfort positions. A retaining strut is coupled to the at least one side wing at a living hinge disposed on a first end of the retaining strut, and further mounted in a longitudinally movable manner to the center part on a second end of the retaining strut at a link disposed on the center part.

It should be pointed out that the features individually listed in the claims can be combined with one another in any technically feasible manner and disclose further embodiments of the invention. The description characterizes and specifies the invention, in addition particularly in connection with the figures.

These and other aspects, objects, and features of the present invention will be understood and appreciated by those skilled in the art upon studying the following specification, claims, and appended drawings.

BRIEF DESCRIPTION OF THE DRAWINGS

Further features and advantages of the invention result from the following description of an exemplary embodiment of the invention to be understood as non-limiting, which is explained in greater detail below with reference to the drawing. In this drawing, the figures show schematically.

In the different figures, equivalent parts in terms of their function are always provided with the same reference numbers, which means that these are also usually described only once.

DETAILED DESCRIPTION OF THE PREFERRED EMBODIMENTS

Figure 1:
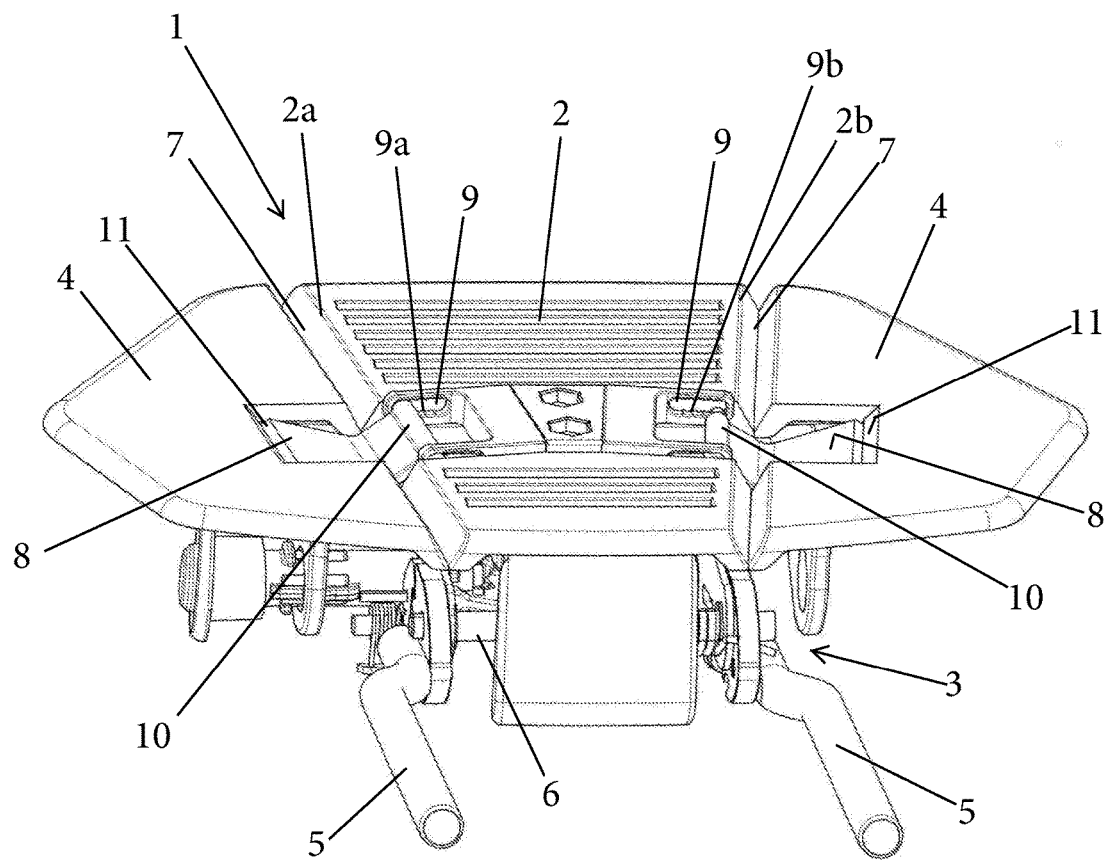
FIG. 1 a perspective view of an embodiment of a headrest according to the invention obliquely from below in a neutral position.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

FIG. 1 shows schematically a perspective view of an embodiment of a headrest 1 according to the invention for a vehicle seat (not shown) viewed obliquely from below, wherein the headrest 1 is shown in a neutral position. The headrest 1 comprises a center part 2, a fastening means 3 for fastening the center part 2 to a backrest (not shown) of the vehicle seat and two side wings 4. The two side wings 4 define first and second side wings which are configured as mirrored structures of one another that are attached to the center part 2 in a similar/mirrored way, such that the comments made herein apply in the same way to one side wing 4 as to other side wing 4.

As can further be seen from FIG. 1, the fastening means 3 in the embodiment of the headrest 1 shown comprises two supporting struts 5 which are arranged parallel to one another and extend into the backrest of the vehicle seat in the state of the headrest 1 being fitted to the vehicle seat. The center part 2 is mounted in a swiveling movable manner about a horizontal swiveling axis 6. The horizontal swiveling axis 6 is defined by a rail that connects to and extends between the struts 5 of the fastening means 3.

Figure 2:
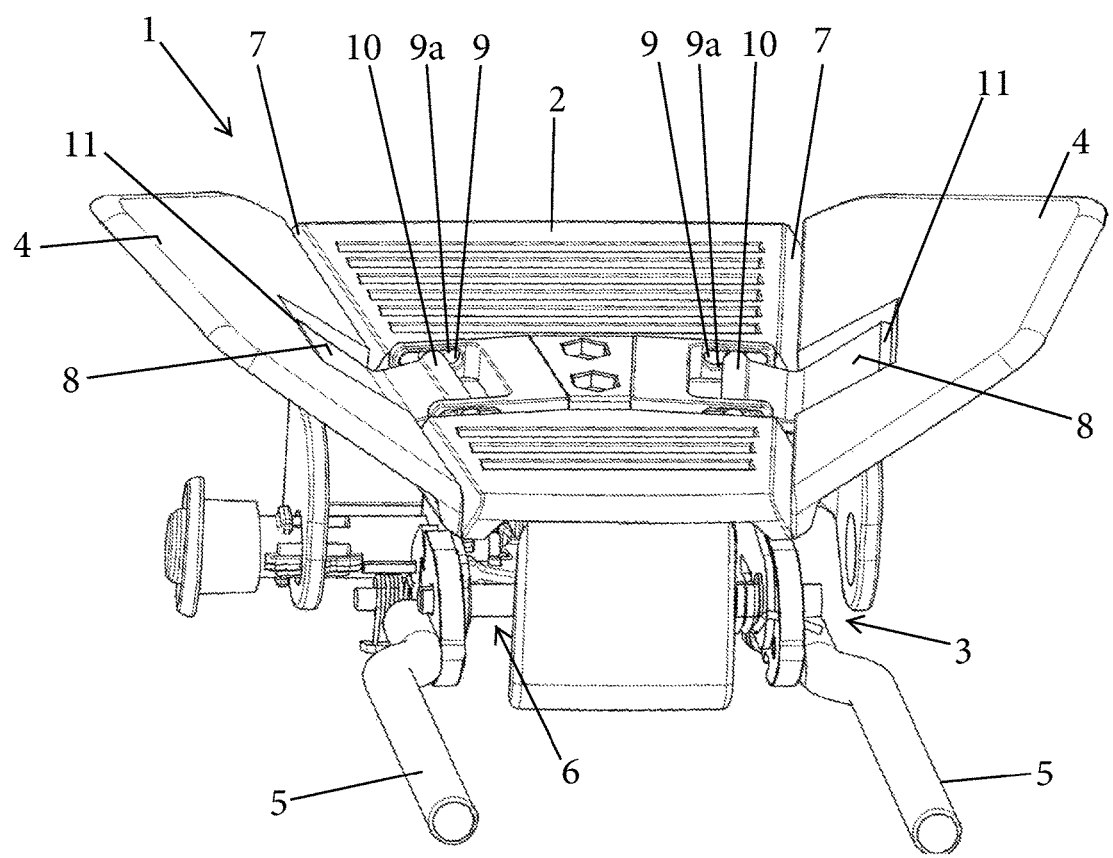
FIG. 2 the headrest according to the invention from FIG. 1 in a comfort position.

Padding (not shown) may be arranged both on the center part 2 and also on the side wings 4 in each case. As shown in FIG. 1, the center part 2 is a mirror-symmetrical having opposed non-parallel sides 2a, 2b trapezoid and the side wings 4 are also trapezoidal in form, wherein the corners are rounded. The base of the trapezoidal side wing 4, in each case, is arranged on one of the non-parallel peripheral sides 2a, 2b of the center part 2 in a swiveling movable manner. In particular, the side wings 4 in the exemplary embodiment of the headrest 1 shown in FIG. 1, are configured integrally with the center part 2, wherein the side wings 4 are connected in a swiveling movable manner to the center part 2 via a swiveling hinge 7, in each case, which swiveling hinge is configured as an integral or living hinge in the headrest 1 shown in FIG. 1. In this way, the side wings 4 are mounted, with respect to the center part 2, for movement between a neutral or ground state position (shown in FIG. 1), and any number of deployed or comfort positions (FIG. 2). In the neutral position, the first and second side wings 4 project diametrically from the center part 2, as shown in FIG. 1, and the headrest 1 adopts its flattest configuration, wherein the center part 2 and the first and second side wings 4 are substantially disposed in a common plane. As can be seen in FIG. 1, the side wings 4 are at an angle of approximately 180° to the center part 2 in the neutral position or flat position.

It can further be seen in FIG. 1 that the first and second side wings 4 are additionally connected to the center part 2 for connection via the integral hinge 7 via first and second retaining struts 8. Each retaining strut 8 is mounted in a swiveling movable manner in each case between the side wing 4 and the center part 2. In the embodiment of the headrest 1 shown in FIG. 1, each retaining strut 8 is also mounted in a longitudinally movable manner on the center part 2. For this purpose, the center part 2 has two links 9 assigned to each retaining strut 8, wherein a pin-shaped member 10 of each retaining strut 8 is guided. The pin-shaped member 10 is formed at one end of the retaining strut 8 facing the center part 2. The pin member 10 is preferably formed integrally on the retaining strut 8. However, it may likewise be configured as a separate component which is then held in a receiving means provided on the corresponding end of a retaining strut 8. The retaining strut 8 is connected via the pin member 10 both in a swiveling movable fashion to the center part 2 and also mounted in a longitudinally movable manner thereon, as the pin member 10 is guided in a transversely displaceable manner at the end in each of the links 9 provided in the center part 2.

In the case of the headrest 1 show in FIG. 1, the links 9 define slots each having a plurality of catch mechanisms (9a, 9b) distributed along their longitudinal extension. The pin member 10 can be fixed in these catch mechanisms and each side wing 4 can thereby be fixed in a plurality of comfort positions (FIG. 2, for example) and also in the neutral position (FIG. 1). Each catch mechanism 9a, 9b is disposed along a slot and each individual catch mechanism corresponds to a specific degree of inward rotation of the side wing with which the catch mechanism is associated.

Furthermore, each retaining strut 8 is configured integrally with the corresponding side wing 4 in the exemplary embodiment of the headrest 1 shown and connected to the side wing 4 by means of an integral or living hinge 11 in a swiveling movable fashion.

FIG. 2 shows schematically the headrest 1 according to the invention from FIG. 1, this time in a comfort position, however, in which the first and second side wings 4 are each swiveled inwardly with respect to a front face of the center part 2. In the comfort position shown, the side wings 4 are each at an angle of roughly 135° to the center part 2. It can be seen in FIG. 2 that by swiveling the side wings 4, the pin members 10 of the retaining struts 8 are further displaced compared with the representation in FIG. 1 relative to the center line (line of symmetry) of the center part 2. In the comfort position of the side wings 4 shown in FIG. 2, the pin members 10 are each fixed in a catch mechanism 9a, 9b on the links 9, so that the side wings 4 are fixed or otherwise retained in the comfort position shown, until repositioned by a user.

In addition, as can be seen from FIGS. 1 and 2, the retaining strut 8 is configured in such a manner that it is substantially adjusted to the contour of the center part 2 and the side wings 4. In particular, the retaining strut 8, in the exemplary embodiment of the headrest 1 shown, is configured as a flat, angled member or L-shaped member. In this way, only small recesses are to be provided in the padding to be attached to the center part 2 and the side wings 4, to allow for the necessary movement of the retaining struts 8 when the side wings 4 are swiveled.

The headrest according to the invention was explained in greater detail with the help of an exemplary embodiment shown in the figures. The headrest is not limited to the embodiments described herein, however, but also comprises further embodiments having the same effect.

In particular, the retaining strut in an alternative embodiment could also be mounted on the center part only in a swiveling movable manner and on the side wing in a swiveling movable and longitudinally movable manner. It would be particularly preferable with a headrest embodiment of this kind for the retaining struts to be integrally configured with the center part, wherein the retaining strut would be connected to the center part by means of an integrated hinge in a swiveling movable manner. Furthermore, the end of the retaining strut turned towards the side wing in a headrest embodiment of this kind would comprise a pin-shaped member with which the retaining strut would be connected to the side wing in a swiveling movable manner, wherein the pin member is guided at the end in a transversely displaceable manner in a link provided in the side wing in each case. In this way, the pin member allows a swivel movement of the retaining strut on the side wing and the link provided in the side wing substantially allows a longitudinal movement of the retaining strut relative to the side wing, in that the pin member would be guided in a displaceable manner in the link transversely to its longitudinal extension.

In addition, it would be conceivable for the retaining strut to comprise a pin-shaped member at each of its two ends (and not only at one), which would be guided in each case in a link provided for in the side wing and in the center part both in a swiveling movable manner and also in a transversely displaceable manner.

In a preferred embodiment, the headrest according to the invention is used in a vehicle, particularly a motor vehicle, wherein the headrest is arranged on a backrest of a vehicle seat fitted in the vehicle.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A headrest for a vehicle seat, comprising:
a center part operably coupled to a backrest of the vehicle seat;

at least one side wing mounted to the center part by a living hinge in a movable swiveling manner with respect to the center part between a neutral position and at least one comfort position; and a retaining strut mounted in a swiveling movable manner between the side wing and the center part, wherein the retaining strut is also mounted in a longitudinally movable manner on one of the side wing and the center part, and further wherein the retaining strut is retained in at least one longitudinal position on one of the side wing and the center part.

2. The headrest as claimed in claim 1, wherein the retaining strut is configured integrally with the side wing and connected to the side wing in a swiveling movable manner by the living hinge.

3. The headrest as claimed claim 2, wherein the retaining strut includes a pin-shaped member at an end of the retaining strut facing the center part to connect the retaining strut to the center part in a swiveling movable manner, and further wherein the pin-shaped member is guided in a transversely displaceable manner at opposite ends thereof by a link disposed in the center part.

4. The headrest as claimed claim 3, wherein the link has at least one catch mechanism along a longitudinal extension thereof, wherein the pin-shaped member is configured to be fixed in the catch mechanism.

5. The headrest as claimed in claim 1, wherein the center part includes a mirror-symmetrical trapezoid configuration having first and second non-parallel peripheral sides, and further wherein the at least one side wing includes first and second side wings connected to the first and second non-parallel peripheral sides of the trapezoid-shaped, respectively.

6. The headrest as claimed in claim 1, wherein the center part and the at least one side wing are integrally formed.

7. The headrest as claimed in claim 1, wherein the center part is operably coupled to the backrest of the vehicle seat by a fastening configuration designed to mount the center part in a swiveling manner relative to the backrest about a horizontal swiveling axis between at least one in-use position and one out-of-use position.

8. The headrest as claimed in claim 7, wherein the fastening configuration includes an adjustable support structure for adjusting a height of the headrest relative to the backrest.

9. A headrest for a vehicle seat, comprising:
a center part;
first and second side wings coupled to first and second sides of the center part by living hinges in a movable manner between first and second positions; and
retaining struts coupled to each of the side wings at a living hinge at one end of each retaining strut and further coupled to the center part at an opposite end of each retaining strut.

10. The headrest of claim 9, wherein the first position defines a neutral position, wherein the first and second side wings are substantially disposed in a common plane with the center part.

11. The headrest of claim 10, wherein the second position includes a plurality of comfort positions, wherein the first and second side wings are angled inward towards a front face of the center part.

12. The headrest as claimed in claim 9, wherein the center part includes a trapezoidal configuration, such that the first and second sides define non-parallel peripheral sides.

13. The headrest as claimed in claim 9, including:
pin-shaped members disposed on the opposite ends of each retaining strut, wherein each pin-shaped member is coupled to a link assembly disposed on the center part.

14. The headrest as claimed in claim 13, wherein the pin-shaped members are received in slots having a plurality of catch mechanisms disposed therealong, wherein each catch mechanism is associated with a specific degree of inward rotation of the associated side wing to which the strut is coupled.

15. The headrest as claimed in claim 9, wherein the retaining struts define L-shaped members.

16. A headrest for a vehicle seat, comprising:
a center part;
at least one side wing disposed on a side of the center part in a movable manner between a neutral position and a range of comfort positions; and
a retaining strut coupled to the at least one side wing at a living hinge disposed on a first end of the retaining strut, and further mounted in a longitudinally movable manner to the center part on a second end of the retaining strut at a link disposed on the center part.

17. The headrest of claim 16, wherein the neutral position defines a configuration wherein the at least one side wing and the center part provide a flat headrest.

18. The headrest as claimed in claim 16, including:
a pin-shaped member disposed on the second end of the retaining strut, wherein the pin-shaped member is coupled to a link assembly disposed on the center part.

19. The headrest as claimed in claim 18, wherein the link includes one or more slots having a plurality of catch mechanisms disposed therealong, wherein each catch mechanism is associated with a specific degree of inward rotation of the at least one side wing.

20. The headrest as claimed in claim 16, wherein the center part includes a trapezoidal configuration.

* * * * *